US012680154B2

(12) United States Patent
Byun et al.

(10) Patent No.: US 12,680,154 B2
(45) **Date of Patent: *Jul. 14, 2026**

(54) METHOD OF FORMING A 3D CONFORMAL CONDUCTIVE PATTERN

(71) Applicant: ENJET CO., LTD, Gyeonggi-do (KR)

(72) Inventors: Do Young Byun, Gyeonggi-do (KR); Won-il Son, Gyeonggi-do (KR); Jang Seung Jun, Gyeonggi-do (KR)

(73) Assignee: Enjet Co. Ltd., Suon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,136

(22) Filed: May 6, 2024

(65) Prior Publication Data

US 2024/0376584 A1 Nov. 14, 2024

(30) Foreign Application Priority Data

May 9, 2023 (KR) ........................ 10-2023-0060189
Jun. 19, 2023 (KR) ........................ 10-2023-0078577

(51) Int. Cl.

*C23C 4/12* (2016.01)
*B05B 5/025* (2006.01)
*C23C 4/18* (2006.01)

(52) U.S. Cl.

CPC ................ *C23C 4/12* (2013.01); *B05B 5/025* (2013.01); *C23C 4/18* (2013.01)

(58) Field of Classification Search

CPC ........... C23C 4/12; C23C 4/18; H10K 71/611; B05B 5/025; B05B 5/0255; B05B 13/0431

See application file for complete search history.

(56) References Cited

U.S. PATENT DOCUMENTS

| | | | | |
|---|---|---|---|---|
| 2009/0065588 A1* | 3/2009 | Aoki | H01L 23/5328 | 438/666 |
| 2013/0307892 A1* | 11/2013 | Byun | B41J 3/4073 | 347/14 |
| 2015/0375246 A1* | 12/2015 | Kalistaja | B05B 17/04 | 174/250 |
| 2023/0226760 A1* | 7/2023 | Lan | B29C 64/112 | 264/308 |

(Continued)

FOREIGN PATENT DOCUMENTS

| | | |
|---|---|---|
| CN | 101394710 | * 3/2009 |
| CN | 109727704 | * 5/2019 |

(Continued)

OTHER PUBLICATIONS

Liu, et al, :"Theoretical and experimental studies of electrostatic focusing for electrohydrodynamic jet printing", J. Micromech. Microeng. 29 (2019) 065002 (7 pages) (Year: 2019).*

*Primary Examiner* — Katherine A Bareford
(74) *Attorney, Agent, or Firm* — Dinsmore & Shohl LLP

(57) ABSTRACT

The present disclosure relates to a method of forming a conductive pattern by printing a conductive ink on a substrate having a three-dimensional surface. The method includes a substrate providing step of mounting the substrate; an ink injection step of printing a conformal conductive pattern on the three-dimensional surface of the substrate by injecting a conductive ink using a nozzle while applying an electric field; and a curing step of forming the injected conductive pattern into a cured conductive pattern by curing.

11 Claims, 11 Drawing Sheets

(56) References Cited

U.S. PATENT DOCUMENTS

| | | | | |
|---|---|---|---|---|
| 2023/0345641 | A1 * | 10/2023 | Zhu | B33Y 30/00 |
| 2024/0376331 | A1 * | 11/2024 | Byun | H05K 3/125 |

FOREIGN PATENT DOCUMENTS

| | | | | | |
|---|---|---|---|---|---|
| CN | 108859098 | | * | 7/2020 | |
| WO | WO-2022110423 | A1 | * | 6/2022 | H01B 13/0026 |
| WO | WO-2022155995 | A1 | * | 7/2022 | B33Y 10/00 |

* cited by examiner

Before cross-cut test
(after sintering @180°C/30min)

After cross-cut test

Example 1

Example 2

Example 3

Example 4

Comparative Example 1

Comparative Example 3

Comparative Example 4

Comparative Example 5

Thermal sintering test of API ink

| Line Width | Sintering Time(min) | | | | | |
|---|---|---|---|---|---|---|
| | 10 | 20 | 30 | 40 | 50 | 60 |
| 10μm | 8423.0 | 3713.5 | 2840.3 | 1698.0 | 1073.0 | 981.0 |
| 20μm | 1261.2 | 768.4 | 742.8 | 319.7 | 445.4 | 535.5 |
| 30μm | 298.7 | 236.7 | 219.5 | 166.3 | 126.0 | 131.0 |

Laser sintering test of API ink

Line Resistance with laser power(Ω/600um)

| Line width | 4000mA | 5000mA | 5500mA | 6000mA | 7000mA | 8000mA |
|---|---|---|---|---|---|---|
| 10㎛ | X (No detection) | 24.0x10^6 | 1700 | 84.8 | 29.1 | 25.8 |
| 20㎛ | 14.0x10^6 | 46.0 | - | 7.0 | 6.3 | 5.7 |
| 30㎛ | 130.0 | 4.0 | - | 2.2 | 2.1 | 1.9 |

Laser sintering test of API ink

✓ No change of line width by laser sintering

Photo-image w/wo laser sintering

| Line width | Laser power : 6000mA | | 7000mA | | 8000mA | |
|---|---|---|---|---|---|---|
| | Printing | Laser sintering | Printing | Laser sintering | Printing | Laser sintering |
| 10㎛ | | | | | | |
| 20㎛ | | | | | | |
| 30㎛ | | | | | | |

Aggregation of Ag particles(10x10μm)

After removing aggregation of Ag particles(20x20μm)

METHOD OF FORMING A 3D CONFORMAL CONDUCTIVE PATTERN

CROSS-REFERENCE TO RELATED APPLICATIONS

This application claims the benefit of co-pending Korean Patent Application Serial No. 10-2023-0060189, filed May 9, 2023, and co-pending Korean Patent Application Serial No. 10-2023-0078577, filed Jun. 19, 2023, which are hereby incorporated by reference in their entirety including the drawings.

TECHNICAL FIELD

The present disclosure relates to a conductive ink, and more specifically, to a conductive ink that can form a conductive pattern on a substrate with a three-dimensional shape.

BACKGROUND

Electrohydrodynamics (EHD), first developed in the 1960s, is a field of study related to a method of controlling the flow of a liquid using an electric field, also called electro-fluid-dynamics or electrokinetics.

EHD ink, whose flow can be controlled using an electric field, has been used in various fields such as printing, surface treatment, and coating. When an electric field is applied, an electrical polarization force occurs between the electrode and the liquid, causing the fluid to move. By applying an electric field between the electrode and the printing material to control the movement of the fluid, the precision of the printed material can be increased.

Typically, EHD ink can be printed on a printing material and includes a polymer material and a solvent.

Meanwhile, even in the case where the substrate is three-dimensional, that is, the substrate is curved or bent, attempts are being made to introduce the principle of electro-hydro dynamics in order to directly print using ink, and research is being actively conducted.

For example, in research and development for bezel-less technology to minimize the bezel area on a TFT substrate in order to maximize the active area, which is the area where images are displayed on a display panel employing a TFT substrate, a technology for forming wiring that continuously connects the top, bottom, and side surfaces of the substrate using ink on a shape where the substrate is bent is being proposed.

That is, the top, bottom and side surfaces of the edge of the substrate have a three-dimensional shape. In the past, in order to print on a 3D surface, printing was performed while moving along the 3D surface, but in this case, the process was complicated and it was difficult to precisely print with uniform line width and pitch.

SUMMARY

An object of one aspect of the present disclosure is to provide a conductive ink that can be printed on a substrate having a three-dimensional shape.

An object of another aspect of the present disclosure is to provide a conductive ink that can conformally print on a substrate having a three-dimensional shape.

An object of another aspect of the present disclosure is to provide a method of forming a conductive pattern capable of printing a conductive pattern on a substrate having a three-dimensional shape using an EHD conductive ink.

According to the present disclosure, a method of forming a conductive pattern, as a method of printing a conductive ink on a substrate having a three-dimensional surface, includes a substrate providing step of mounting the substrate;

an ink injection step of printing a conformal conductive pattern having an aspect ratio (aspect ratio: width to height) of 0.05 to 0.3 on the three-dimensional surface of the substrate by injecting a conductive ink using a nozzle while applying an electric field; and a curing step of forming the injected conductive pattern into a cured conductive pattern by curing.

At this time, it is preferable that the conductive pattern is thermally or photocured after injection.

In addition, it is preferable that the substrate having the three-dimensional surface has a three-dimensional structure on the surface, or the substrate itself has a three-dimensionally curved or folded shape.

In addition, in the ink injection step, it is preferable that the three-dimensional surface is an upper and lower surface and a side surface of a corner where a substrate on which a TFT is formed is bent, and the composition forms an electrical pattern that continuously connects the front surface and the side surface or the rear surface and the side surface.

In addition, in the ink injection step, a conductive pattern having a line width of W1 is formed, and when a conductive pattern of W2 is formed after curing the conductive pattern with a laser power of 6000 mA to 8000 mA in the curing step, it is preferable that W2/W1 is 0.9 to 1.1.

In addition, in the ink injection step, it is preferable to first print on a portion of the side surface and the front surface to form a portion of the pattern, and then invert the substrate to print on a portion of the side surface and the rear surface to form a desired conductive pattern.

In addition, in the ink injection step, when the ink approaches one surface of the substrate, the ink can move toward the substrate, so that the ink ejected from the nozzle and extended long can be printed on one surface of the substrate facing each other.

In addition, in the ink injection step, after the nozzle passes from one side of the substrate to the other side, the nozzle can be moved in the opposite direction again to print in an overlapping manner.

In addition, in the ink injection step, it is preferable that a plurality of nozzles are used.

In addition, in the ink injection step, it is preferable to form the conductive pattern by a straight jet flow section (J1) or a spinning jet flow section (J2).

In addition, it is preferable that the voltage of the electric field during printing is 1 kV to 2 kV.

In addition, it is preferable that the printing speed is 100 mm/s to 200 mm/s. The present disclosure also provides an electronic device in which conformal conductive wiring is formed on a substrate having a three-dimensional surface shape using the substrate printing conductive ink composition according to any one of the preceding paragraphs.

Advantageous Effects The conductive ink according to one aspect of the present disclosure can be printed on a substrate having a three-dimensional shape, such that even when the substrate is three-dimensional, electrical wiring having conductivity can be directly formed on the substrate, and at this time, the line width of the electrical wiring can be formed uniformly and finely.

The printing method on a three-dimensional substrate according to one aspect of the present disclosure has the effect of enabling uniform, fine, and efficient printing of electrical wiring having conductivity directly on a three-dimensional substrate using the EHD principle.

That is, by using EHD jetting, which considers the electric field change caused by the previously printed pattern and performs the next printing, the line width of the ink being discharged is measured in real time and the line width is controlled, enabling precise printing on a 3D surface with a fine line width.

DETAILED DESCRIPTION

Figure 1:
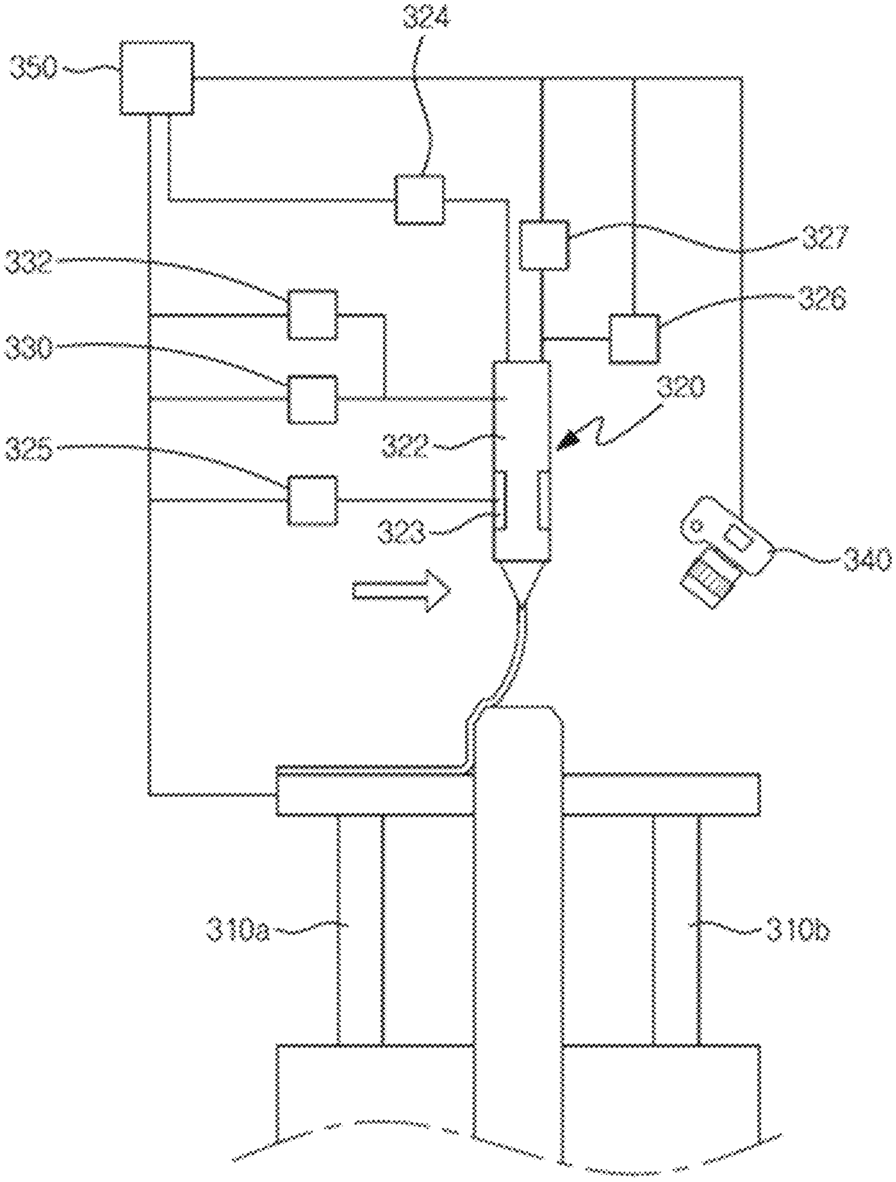
FIG. 1 illustrates an EHD printing apparatus in which the conductive ink of the present disclosure can be used.

Hereinafter, before describing the present disclosure in detail, it should be understood that the terms used in this specification are only for describing specific embodiments and are not intended to limit the scope of the present disclosure, which is defined only by the appended claims. All technical and scientific terms used in this specification have the same meaning as generally understood by those skilled in the art, unless otherwise mentioned.

Here, 1) the shapes, sizes, ratios, angles, numbers, etc. shown in the attached drawings are approximate and may be slightly changed. 2) The drawings are illustrated from the observer's point of view, so the direction or position for describing the drawings may vary depending on the observer's position. 3) The same reference numerals may be used for the same parts even if the drawing numbers are different. 4) When "comprise", "comprises", "comprising", "have", "is composed of", etc. are used, other parts may be added unless "only" is used. 5) When described in the singular, it may also be interpreted in the plural. 6) Even when the comparison of shape or size, positional relationship, etc. is not described as "about, substantially", it is interpreted to include the usual margin of error. 7) Even when terms such as "after, before, next, subsequent, at this time" are used, they are not used in the sense of defining a temporal position. 8) The terms "first, second, third" are used selectively, interchangeably, or repeatedly simply for the convenience of distinction and are not interpreted in a limiting sense. 9) When the positional relationship between two parts is described as "on, above, below, beside, on the side, between", unless "directly" is used, one or more other parts may be located between the two parts. 10) When parts are electrically connected by "or", both the parts alone and the combination are interpreted to be included, but when electrically connected by "or, one of", only the parts alone are interpreted.

In this specification, EHD ink refers to an ink used in a printing method that applies an electric field between an electrode and a printing material to control the movement of a fluid, and is not limited to the ink spraying method. For example, it includes contact printing in which the nozzle is sprayed close to the electrode during spraying, electrospinning printing in which the fluid is continuously connected to the substrate from the nozzle, and drop-on-demand printing.

In this specification, a conformal line refers to a line that is continuously connected while being in close contact with the shape of the surface on the three-dimensional curved surface of the surface of the printing material.

<First Aspect>

Hereinafter, the conductive ink according to one aspect of the present disclosure will be described. The conductive ink includes an electric field reaction element, a charge transfer element, a conductive element, a binder, a solvent, and a thixotropic agent.

The EHD method is a method of controlling a solution by spraying through a jet of an electrically charged polymer solution and melt while controlling the solution with a magnetic field, and the electric field reaction element is preferably a water-soluble polymer including a heterogeneous element that can react to assist the movement of charges in an electric field, which can be dissolved by a polar solvent.

That is, the electric field reaction element includes O (oxygen), N (nitrogen), S (sulfur), P (phosphorus), M (metal), etc. attached to the backbone of the polymer, which are affected by the electric field.

As the water-soluble polymer, a polymer having a hydroxyl group (—OH), an amide samine (—NHR), a tertiary amine (—RNR), a carboxyl group (—COO-M+), a sulfo group (—SOOM), a phosphoric acid group (—OPOOM), or a sulfuric acid group (—OSOOOM) as a functional group can be used.

Specific examples include starch, gums (polysaccharides), cellulose having a hydroxyl group, PAO poly(acrylic polyol), PEO (polyethylene oxide), PVA (polyvinyl alcohol), PAAM (polyacrylamide), PVP (polyvinylpyrrolidone), PAA (polyacrylic acid), PSSA (polystyrenesulfonic acid), PPA (polyphosphoric acid), PESA (polyethylenesulfonic acid), PEI (polyethylenimine), PAs (polyamines), PAMAM (polyamidoamine), poly(2-vinylpiperidine salt), poly(vinylamine salt), etc.

It is good for the molecular weight (Mw) of the above water-soluble polymer to be between 500 and 1,000,000. If it is less than 500, there is a problem that the electric field reactivity of EHD and adhesion to the substrate are not good. On the other hand, if it exceeds 1,000,000, the viscosity becomes very high, making it difficult to print.

The binder is used as a substance that imparts adhesion to the substrate. In the present patent, epoxy-based binders and acryl-based binders can be used. Examples of the epoxy-based binder include bisphenol A type epoxy resins, alicyclic epoxy resins, linear aliphatic epoxy resins, cresol novolac type epoxy resins, biphenyl type epoxy resins, linear aliphatic epoxy resins, heterocyclic epoxy resins, halogenated epoxy resins, etc., which contain 2 or more epoxy groups per molecule, and 2 or more of these epoxy resins may be used in combination.

It is preferable to use the epoxy resin in an amount of 5 to 15% by weight based on the total amount of the epoxy-based binder. If the content of the epoxy resin is less than 5% by weight, the adhesion to the substrate is poor, and if it exceeds 30% by weight, there is a problem that the electrical resistance with the substrate increases.

As the acryl-based binder, one having a linear or branched alkyl group having 1 to 24 carbon atoms at the ester terminus can be used, and an alkyl (meth)acrylate can be exemplified. The alkyl (meth)acrylate includes both an alkyl acrylate and an alkyl methacrylate, and the alkyl (meth)acrylate can be specifically exemplified by n-butyl (meth)acrylate, s-butyl (meth)acrylate, t-butyl (meth)acrylate, isobutyl (meth)acrylate, n-pentyl (meth)acrylate, isopentyl (meth)acrylate, isohexyl (meth)acrylate, isoheptyl (meth)acrylate, 2-ethylhexyl (meth)acrylate, isooctyl (meth)acrylate, isononyl (meth) acrylate, etc., and these can be used alone or in combination of two or more.

In addition, a monomer other than the alkyl (meth) acrylate may be included. That is, an additional monomer can be used in addition to the alkyl (meth)acrylate.

That is, the additional monomer may be a hydroxyl group-containing monomer as a monofunctional monomer component. As the hydroxyl group-containing monomer, one having a polymerizable functional group such as a (meth)acryloyl group or a vinyl group and also having a hydroxyl group can be used without particular limitation.

Examples of the hydroxyl group-containing monomer include 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth) acrylate, etc., which are hydroxyalkyl (meth)acrylates; (4-hydroxymethylcyclohexyl)methyl (meth)acrylate, etc., which are hydroxyalkylcycloalkane (meth)acrylates. In addition, hydroxyethyl (meth)acrylamide, allyl alcohol, 2-hydroxyethyl vinyl ether, 4-hydroxybutyl vinyl ether, diethylene glycol monovinyl ether, etc. can be exemplified. These can be used alone or in combination. Among these, hydroxyalkyl (meth)acrylates are suitable.

The charge transfer element is an element that provides a charge that moves in an electric field in the ink, and it is split into ions in an aqueous solution state and moves as a charge, affecting the electric field reaction elements (O, N, S, P, M) to control the fluidity of the ink.

As the charge transfer element, substances having high ionization and water solubility, such as ammonium hydroxide, sodium chloride (NaCl), sulfonic acid, hydrochloric acid, sodium hydroxide (NaOH), and potassium hydroxide (KOH), can be used.

The conductive element is an element for imparting conductivity to the ink, and refers to metal or non-metal nanoparticles having conductivity. Representatively, metal particles such as silver (Ag) particles, nickel (Ni), gold (Au) particles, copper (Cu), indium (In), tin (Sn), and alloys or coatings thereof can be used.

In addition, conductive metal oxides such as ITO (indium tin oxide) and antimony oxide (Sb), and dispersions of conductive carbon and conductive polymer can be used. Also, the shape of the metal particles can be spherical, bump-shaped, flake-shaped, or wire-shaped.

The conductive element can be included to have at least two or more materials or at least two or more shapes. For example, silver particles and copper particles can be mixed, or particles of different shapes such as spherical and bump shapes can be mixed.

The average particle size of the conductive element is preferably 0.01 to 3.0 μm, and more preferably 0.2 to 0.7 m. If it exceeds the above range, there is a problem that it is difficult to print a fine line width of 10 μm or less, and if it is less than that, the viscosity becomes very high due to the increase in specific surface area, making it difficult to print, and there is a problem that dispersion becomes difficult.

Meanwhile, in the examples of the present disclosure, in order to prevent the change in line width after laser curing, it is preferable that the conductive element has different particle sizes or shapes within the above-mentioned size, and the CV % (Coefficient of Variation) of the particle size is preferably 10 to 40, more preferably 20 to 30.

If the CV % value is smaller than the above range, the line width may decrease after curing, and if the CV % value is larger than the above range, there may be a problem that the line width increases after curing.

The change in line width should consider the composition of the ink, the power, concentration, irradiation time of the laser, the characteristics of the electrode surface, the viscosity of the ink, and the dispersibility, and the change in line width was the smallest within the above range when considering other characteristics of the present disclosure.

The solvent is not particularly limited as long as it can dissolve the electric field reaction element and the binder, but water, tetrahydrofuran (THF), alcohol-based solvents, ether-based solvents, sulfide-based solvents, toluene-based solvents, xylene-based solvents, benzene-based solvents, alkane-based solvents, oxane-based solvents, amine-based solvents, polyol-based solvents or diketones, amino alcohols, polyamines, ethanol amines, diethylnol amines, ethane thiols, propane thiols, butane thiols, pentane thiols, hexane thiols, heptane thiols, octane thiols, nonane thiols, decane thiols, undecane thiols, or combinations thereof can be used.

Thixotropic agents are used to control the fluidity of the printed ink on the substrate after printing. Examples of organic thixotropic agents include RHEBYK-100, RHEBYK-405, RHEBYK-410, RHEBYK-411, RHEBYK-440, RHEBYK-7405, etc. Examples of inorganic thixotropic agents include synthetic silica, bentonite-based, and ultra-fine precipitated calcium carbonate.

Meanwhile, it is preferable that the conductive element is included in an amount of 65% by weight or more of the total ink weight. Also, it is preferable that the electric field reaction element is included in an amount of 3 to 10 parts by weight based on 70 parts by weight of the conductive element, and more preferably 4 to 7 parts by weight. If it exceeds the above range, the electrical resistance increases after sintering, and if it is less than that, a problem occurs in that control is not possible.

Also, it is preferable that the electric field reaction element and the charge transfer element are included in a weight ratio of 10:1 to 3:1. These two elements interact with each other and determine the ejection performance of the ink in the electric field, and the charge transfer element enables charge movement to make the ink react to the electric field, and the electric field reaction element enhances this reaction to enable more effective ejection.

In particular, if it deviates from the above range, the electrical force applied to the ink increases, causing problems such as clumping or excessive discharge of ink inside the nozzle, or it becomes difficult to apply electrical force to the ink, causing problems such as not being able to print.

The above composition can be controlled into a desired conductive pattern and then cured to become a cured conductive pattern, which can function as a wiring on the substrate.

At this time, when the width of the conductive pattern formed by applying the above composition is W1, and the width after curing the conductive pattern with a laser power of 6000 mA to 8000 mA is W2, in the examples of the present disclosure, even after curing with a laser, the change in line width of the conductive pattern is small, so it is preferable that W2/W1 is 0.9 to 1.1, and more preferably 0.95 to 1.05.

The viscosity of the above ink composition is preferably 1,000 to 20,000 cPs at 25° C. If it exceeds the above range, the viscosity is high, making it difficult to print and difficult to form a conformal line, and if it is less than that, the print height is low, causing a problem of increasing electrical resistance after sintering.

Also, the thixotropy is preferably 1.0 to 5.0. If it exceeds the above range, the strength of the applied electric field must be increased, so there is a problem of electric shot occurring due to high printing voltage, and if it is less than that, the print height is low after printing, causing a problem of increasing electrical resistance after sintering.

At this time, the pattern formed as a line forms a continuous conformal conductive line with an aspect ratio (width to height) of 0.1 to 0.2 on a substrate having a three-dimensional surface.

<Second Aspect>

The method of printing a conductive ink on a substrate having a three-dimensional surface according to the second aspect of the present disclosure includes a substrate providing step, an ink spraying step, and a curing step.

The substrate providing step is a step of placing a substrate having a three-dimensional surface. A substrate having a three-dimensional surface refers to a substrate having a three-dimensional structure on the substrate surface, or a substrate that is curved or bent in a three-dimensional shape.

For example, a surface that continues from the top or bottom surface of the substrate to the side surface of the substrate may be a substrate having a three-dimensional shape because it includes a bent surface.

The ink spraying step is a step of spraying a conductive ink in a desired pattern using an EHD printing apparatus capable of spraying a conductive EHD ink.

FIG. 1 illustrates an EHD printing apparatus in which the conductive ink of the present disclosure can be used. According to this, the EHD printing apparatus according to one embodiment of the present disclosure is a 3D surface printing apparatus using EHD jet printing (ElectroHydro-Dynamics Jet printing), and may include a jig unit (310), a nozzle unit (320), a moving unit (330), an imaging unit (340), and a control unit (350).

As described above, the EHD printing apparatus can print on a substrate (112) having a three-dimensional surface, and for example, can print a fine-width pattern that continuously connects along the front surface of the substrate edge, the rear surface of the substrate edge, and the side surface between the front and rear surfaces.

The jig unit (310) supports both sides of the substrate (112) and fixes the substrate (112) in an upright position. At this time, the first jig (310*a*) on the left may support the front surface of the substrate (112), and the second jig (310*b*) on the right may support the rear surface of the substrate (112) while pressing it with a certain force.

The substrate (112) is not limited in material or size, but may be a glass substrate, a silicon substrate, or a substrate made of a plastic material including a flexible substrate. Also, it may be a substrate in which plastic and glass are formed in a multilayer structure.

The first and second jigs (310*a*, 310*b*) are arranged to be movable in the left and right horizontal direction according to a control signal from the control unit (350), and clamp or release the substrate (112). At this time, when the substrate (112) is fixed in an upright position by the jig unit (310), the side surface (112*a*) of the substrate (112) may face upward over the first and second jigs (310*a*, 310*b*) so that the edge region can be printed.

The nozzle unit (320) includes a nozzle (322), an electrode (323), a high-voltage controller (325), an air pressure controller (326), and a syringe pump (327). Also, the nozzle unit (320) may further include a nozzle angle changing unit (324).

The nozzle (322) discharges ink through EHD jetting at the upper part of the substrate (112) erected by the jig unit (310), and the electrode (323) is applied with a voltage for forming an electric field for EHD jetting, and may be formed inside or outside the nozzle.

The high-voltage controller (325) supplies a high voltage to the electrode (323) for EHD jetting. By supplying a high voltage to the electrode (323), an electric field is formed around the nozzle (322), and the ink can be discharged from the nozzle (322) by the force of the electric field.

The air pressure controller (326) controls the air pressure inside the nozzle (322), provides a force to discharge the ink from the nozzle (322), and controls the flow rate of the ink discharged from the nozzle (322).

The syringe pump (327) supplies ink to the inside of the nozzle (322). That is, it supplies ink stored in an ink storage tank (not shown) to the inside of the nozzle (322), and the flow rate of the discharged ink can also be controlled by controlling the amount of ink supplied from the syringe pump (327).

The moving unit (330) moves the nozzle (322) arranged at the upper part of the erected substrate (112) left and right at a certain speed with the substrate (112) as the center. At this time, the acceleration may change during the left and right movement process. When the nozzle (322) moves horizontally in a straight reciprocating motion, the nozzle (322) may be set to maintain a certain distance from the side surface of the substrate (112) so that the lowermost end of the nozzle (322) does not interfere with the side surface of the substrate (112).

The up-down moving unit (332) moves the nozzle (322) up and down to change the vertical distance between the nozzle (322) and the substrate (112), and may be selectively provided.

The nozzle angle changing unit (324) changes the angle of the nozzle (322). The nozzle angle changing unit (324) may be controlled by the control unit (350). As shown in FIG. 19, when printing is performed on the edge region of the substrate (112) while moving the nozzle left and right by the moving unit (330), the angle of the nozzle (322) may be changed according to the moving direction of the nozzle (322) by the nozzle angle changing unit (324).

Figure 2:
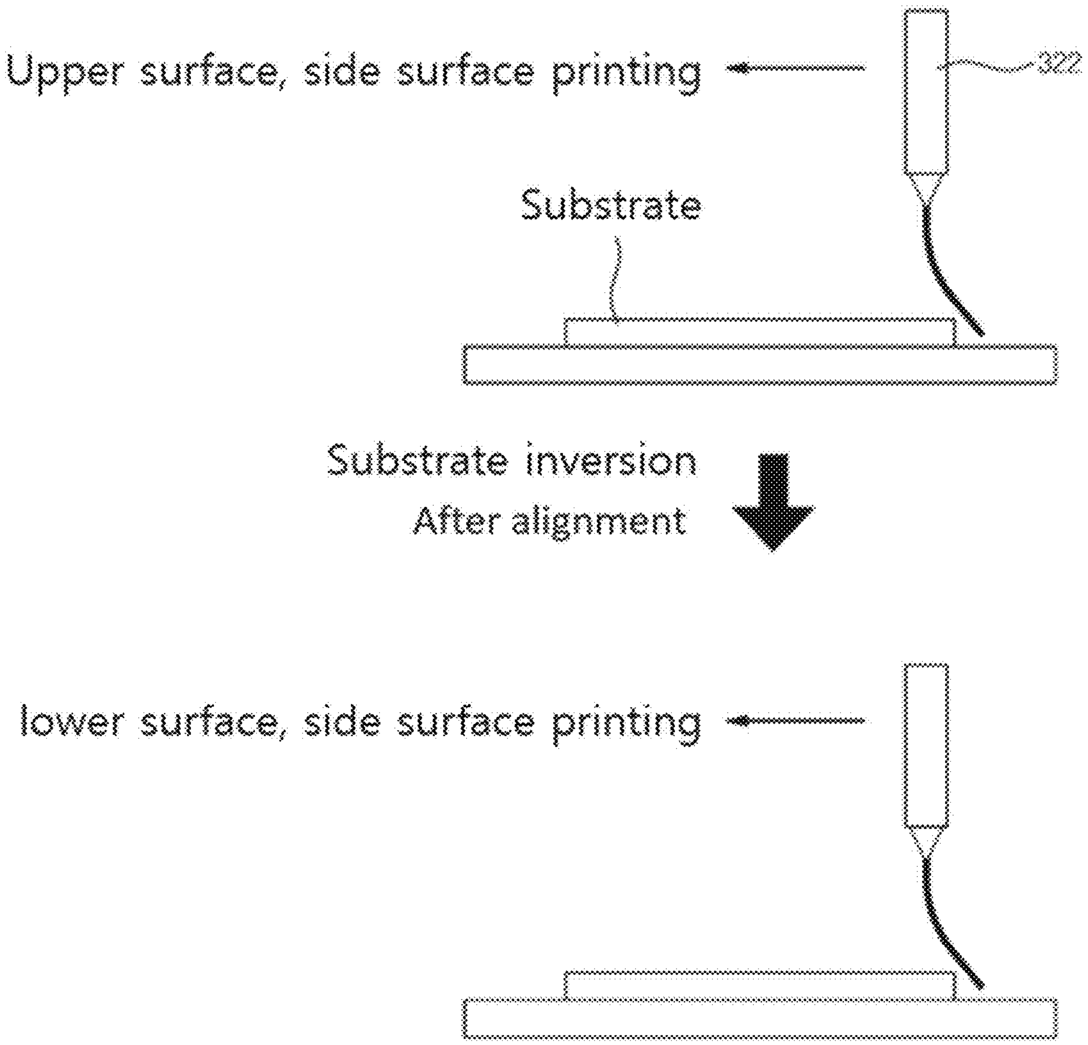
FIG. 2 is a conceptual diagram illustrating the operation of the EHD printing apparatus.

Hereinafter, the operation of the EHD printing apparatus will be described. FIG. 2 is a conceptual diagram illustrating the operation of the EHD printing apparatus.

According to this, when the nozzle (322) is moved left or right while discharging ink from the nozzle (322), gravity, force by the electric field, and inertial force act together on the discharged ink, and it can be printed on the substrate (112). When the nozzle (322) is moved by the moving unit (330), the lower part of the discharged ink may be bent in the moving direction or the opposite direction by inertial force.

At this time, when the ink approaches one side surface of the substrate (112), the force by the electric field acts greatly, so that the ink moves toward the substrate (112), and the ink that is discharged from the nozzle (322) and is elongated can be printed in a straight line on the opposite side surface of the substrate (112). At this time, after the nozzle (322) passes from one side to the other side of the substrate (112), if the nozzle (322) is moved again in the opposite direction, ink can be printed in a straight line on the other side surface of the substrate (112) by the same principle.

Therefore, the ink spraying step can spray the conductive ink on a desired substrate having a three-dimensional surface in a desired pattern using the EHD printing apparatus.

For example, when printing a fine-width pattern that continuously connects along the front surface of the substrate edge, the rear surface of the substrate edge, and the side surface between the front and rear surfaces, which are the edge regions of the substrate, a portion of the pattern is first formed by printing on a portion of the side surface and the front surface, and then a portion of the side surface and the rear surface is printed to form a desired side wiring pattern.

The voltage for printing is preferably 1 kV to 2 kV The voltage of the electric field applied to the ink used in the present disclosure is important for controlling the flow of the ink, and in particular, an appropriate voltage must be applied in order to form a conformal conductive pattern on the substrate.

If it is less than 1 kV, the ink is not continuously formed as a conductive pattern, and if it exceeds 2 kV, the ink is excessively sprayed, resulting in a thick spray rather than conformal.

The printing speed is preferably 100 mm/s to 200 mm/s. The printing speed affects the uniformity and quality of the line for conformal coating, and if it exceeds the above range, the ink may not be properly deposited, and if it is less than the above range, the printing speed may lower the process efficiency.

The curing step is a step of curing a conductive pattern formed by the sprayed conductive ink. At this time, thermal or photo-curing may be performed, and as the curing progresses, the resistance decreases and the conductivity increases.

After EHD printing, the ink must be properly dried and sintered, and temperature and time, and the moving speed and power of the laser play an important role in this process.

Figure 3:
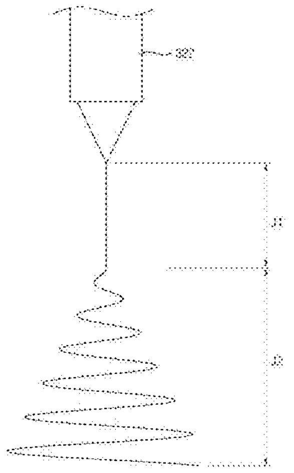
FIG. 3 is a conceptual diagram illustrating a flow section when ink is discharged from the nozzle (322).

Referring to FIG. 3, when ink is discharged from the nozzle (322), ink in the straight jet flow section (J1) and the spinning jet flow section (J2) can be printed on the substrate (112) according to the spacing between the substrate (112) and the nozzle (322). The straight jet flow section (J1) means that the ink discharged from the nozzle (322) flows along a straight direction perpendicular to the substrate (112), and the spinning jet flow EENNsection (J2) means that the ink flows in a spiral or cone shape below the straight jet flow section. For reference, in FIG. 3, the spinning jet flow section is somewhat exaggerated for explanation.

In the present disclosure, the conductive pattern (182) can be mainly formed by the straight jet flow section (J1). However, if it is necessary to widen the line width of the conductive pattern (182), it may also be formed by the spinning jet flow section (J2).

As a specific application example of the printing method of the conductive ink, the present disclosure can be used in a 3D surface printing apparatus for edge regions of a substrate when printing is performed for a side wiring (120) of a display module (10) composed of micro LEDs (150).

Figure 4:
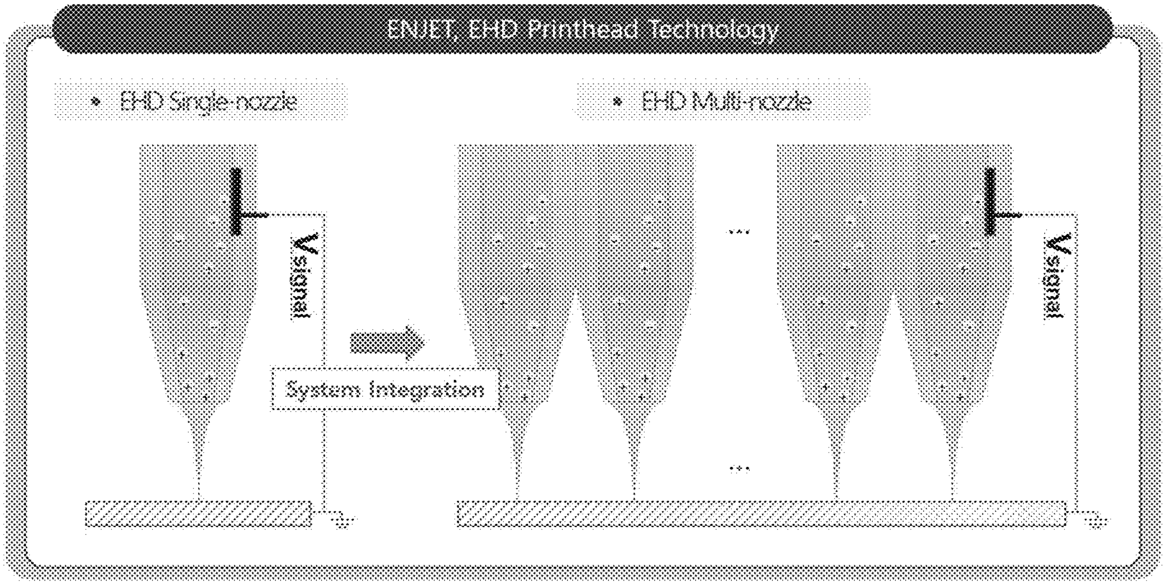
FIG. 4 is a conceptual diagram comparing the case where there is one nozzle and the case where there are multiple nozzles.

Meanwhile, the EHD printing apparatus has been described for the case where there is one nozzle, but a plurality of nozzles may be formed for process efficiency. FIG. 4 is a conceptual diagram comparing the case where there is one nozzle and the case where there are multiple nozzles.

EXAMPLES

Example 1

PVP (polyvinylpyrrolidone) 5 g was completely dissolved in ethanol Ig, ethylene glycol Ig, and butyl carbitol 11 g. To the dissolved solution, ammonium hydroxide Ig as a charge transfer element, Ag powder 70 g, epoxy-based binder 10 g, and REBYK-410 (BYK) 1 g were mixed and a conductive ink was prepared using a 3-roll mill.

Examples 2 to 7

Prepared in the same manner as in Example 1, except that the composition was changed as shown in Table 1.

Comparative Examples 1 to 5

Prepared in the same manner as in Example 1, except that the composition was changed as shown in Table 2.

TABLE 1

| | | Example 1 | Example 2 | Example 3 | Example 4 | Example 5 | Example 6 | Example 7 |
|---|---|---|---|---|---|---|---|---|
| Ag powder type | spherical | 70 | | | 50 | | 70 | 70 |
| | Bump type | | 70 | | | 50 | | |
| | Flake type | | | 70 | | | | |
| | Wire type | | | | 20 | 20 | | |
| Binder | Epoxy | 10 | 10 | 10 | 10 | 10 | | 10 |
| | Acryl | | | | | | 10 | |
| Electric field reaction element | PVP | 4 | 3.5 | 4.8 | 4 | 7 | 9.5 | |
| | PVA | | | | | | | 5 |
| Charge transfer element | ammonium hydroxide | 1 | 1 | 1 | 1 | 1 | 1 | 1 |
| Solvent | Water | | | | | | | |
| | Ethanol | 1 | 1 | 1 | 1 | 1 | 1 | 1 |
| | ethylene glycol | 1 | 1 | 1 | 1 | 1 | 1 | 1 |
| | butyl-carbitol | 11 | 11 | 12 | 11 | 11 | 11 | 11 |
| TI Additive | RHEBYK-410(BYK) | 1 | 1 | 1 | 1 | 1 | 1 | 1 |

TABLE 2

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Ag powder type | spherical | 70 | 70 | 70 | 0 | 70 | 70 | 70 |
| | Bump type | | | | | | | |
| | Flake type | | | | | | | |
| | Wire type | | | | | | | |
| Binder | Epoxy | 10 | 0 | 10 | 10 | 10 | 10 | 10 |
| | Acryl | | | | | | | |
| Electric field reaction element | PVP | 0 | 5 | 5 | | 5 | 1 | 12 |
| | PVA | | | | 5 | | | |
| Charge transfer element | ammonium hydroxide | 1 | 1 | 0 | 0 | 0 | 1 | 1 |
| Solvent | Water | | | | | | | |
| | Ethanol | 1 | 1 | 1 | 1 | 1 | 1 | 1 |
| | ethylene glycol | 1 | 1 | 1 | 1 | 1 | 1 | 1 |
| | butyl-carbitol | 16 | 21 | 12 | 12 | 13 | 15 | 11 |
| TI Additive | RHEBYK-410(BYK) | 1 | 1 | 1 | 1 | 0 | 1 | 1 |

EXPERIMENTAL EXAMPLES

(Experimental Example 1) Spinning Characteristics

The inks of Examples 1 to 7 and Comparative Examples 1 to 7 were evaluated for the characteristics that enable pattern formation through EHD.

(Experimental Example 2) Adhesion Measurement

Figure 5:
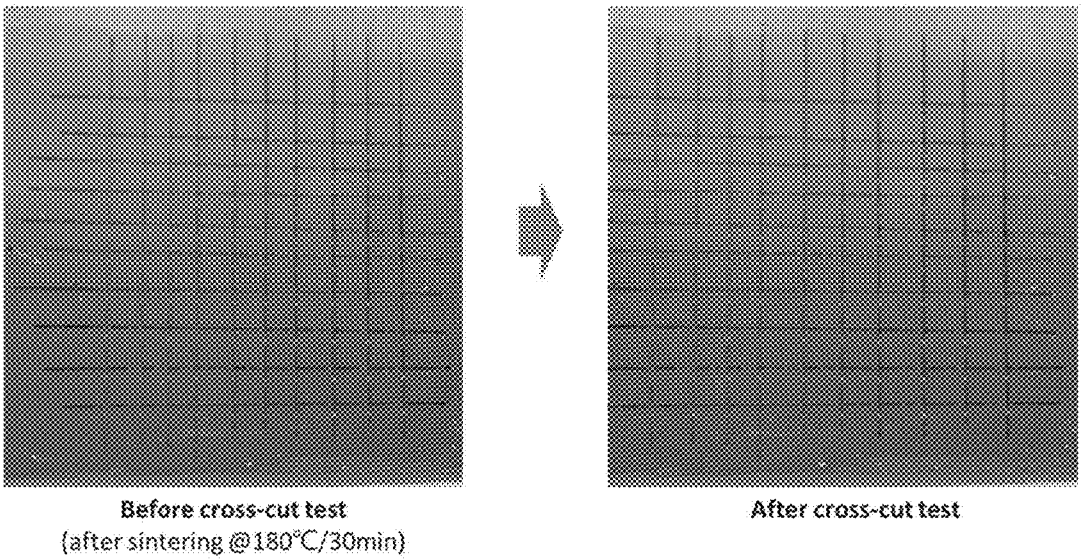
FIG. 5 is a photograph of an adhesion test in progress.

The conductive inks prepared in Examples 1 to 7 and Comparative Examples 1 to 7 were coated on a PET film to a thickness of 5 μm using a spin coater. After coating, it was dried at 80° C. for 30 minutes. The film prepared in this way was subjected to an adhesion test (cross-cut test (ASTM D3359) method), and FIG. 5 is a photograph of the adhesion test in progress.

(Experimental Example 3) Hardness Measurement

The conductive inks prepared in Examples 1 to 7 and Comparative Examples 1 to 5 were coated on a PET film to a thickness of 5 μm using a spin coater. After coating, the hardness of the conductive pattern formed by drying at 80° C. for 30 minutes was measured by the pencil hardness tester (ASTM D3363) method.

(Experimental Example 4) Specific Resistance Measurement

The specific resistance (μΩ·cm, 180° C./30 min) of the conductive pattern formed with the conductive inks of Examples 1 to 7 and Comparative Examples 1 to 5 was measured.

The results of Experimental Examples 1 to 4 are shown in Tables 3 and 4.

TABLE 3

| | Example 1 | Example 2 | Example 3 | Example 4 | Example 5 | Example 6 | Example 7 |
|---|---|---|---|---|---|---|---|
| CV % | 24.12 | 35.68 | 34.64 | 30.41 | 40.22 | 38.47 | 35.25 |
| Spinning characteristics | Good | Good | Good | Good | Good | Good | Good |
| Pencil hardness tester (ASTM D3363) | 5B | 5B | 5B | 5B | 5B | 5B | 5B |
| Pencil hardness tester (ASTM D3363) | 2H | 2H | 2H | 2H | 2H | 2H | 2H |
| Viscosity (μΩcm, 180° C./30 min) | 11 | 40 | 31 | 24 | 65 | 64 | 58 |

TABLE 4

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| CV % | 51.87 | 43.21 | 48 | — | 44.78 | 44.24 | 55.11 |
| Spinning characteristics | Poor | Good | Poor | Poor | Poor | Poor | Good |
| Pencil hardness tester (ASTM D3363) | 5B | 0B | 5B | 2B | 5B | 5B | 5B |
| Pencil hardness tester (ASTM D3363) | 2H | 2H | 2H | 2H | 2H | 2H | 2H |
| Viscosity (μΩcm, 180° C./30 min) | 102 | 80 | 95 | Insulation | 85 | 87 | 115 |

(Experimental Example 5) Electron Microscope Photography

Figure 6:
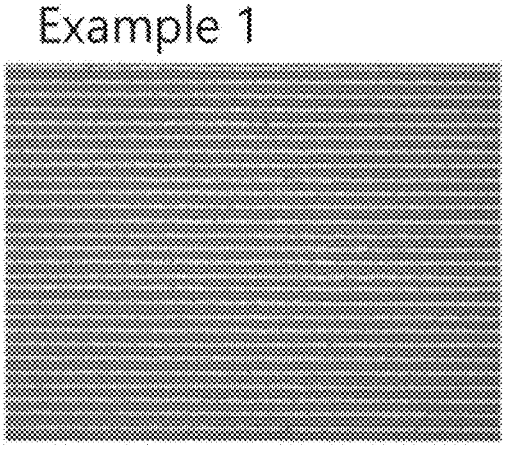
FIG. 6 is an electron microscope photograph of a conductive pattern formed by applying the examples and comparative examples of the present disclosure in an EHD method.
Figure 6:
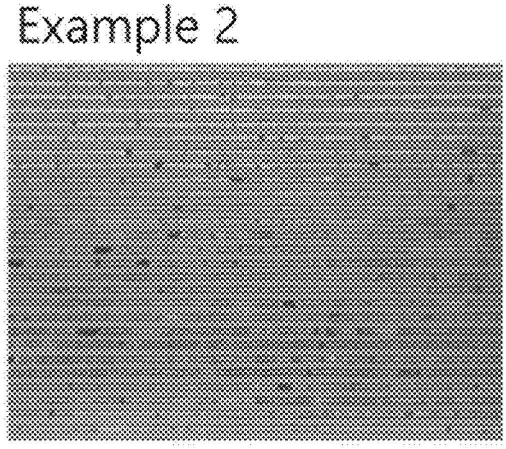
Figure 6:
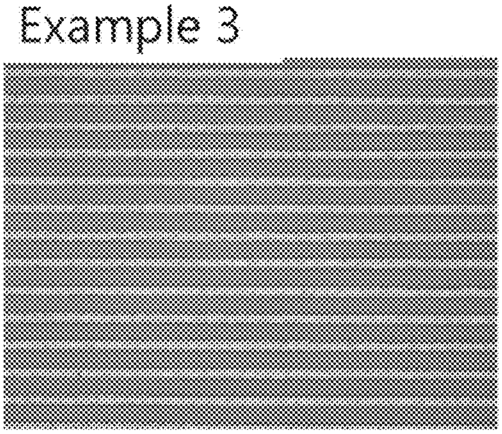
Figure 6:
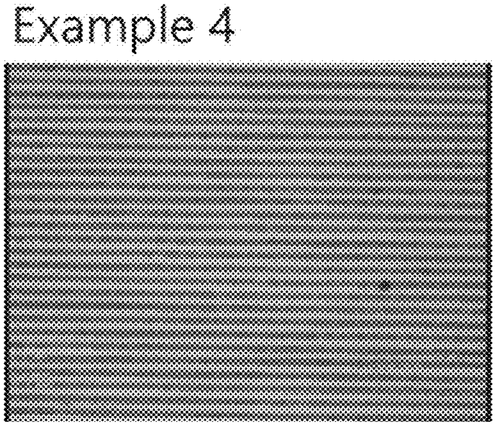
Figure 7:
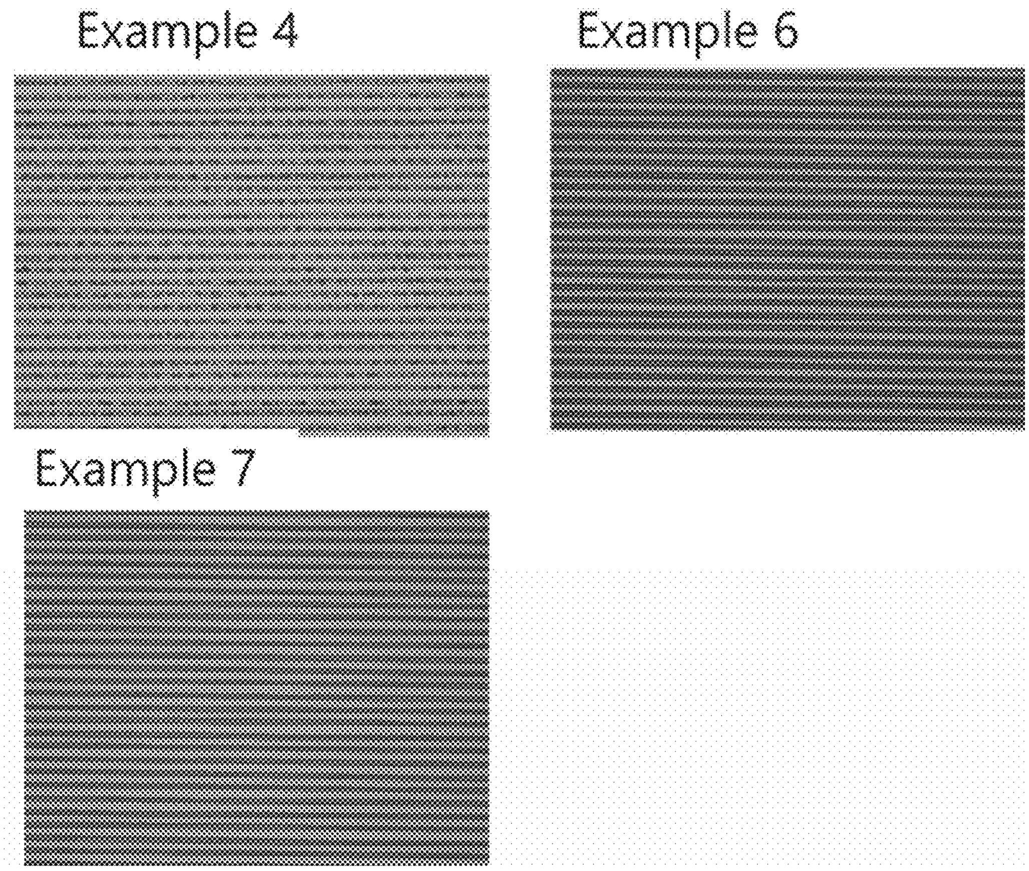
FIG. 7 is an electron microscope photograph of a conductive pattern formed by applying the examples and comparative examples of the present disclosure in an EHD method.
Figure 8:
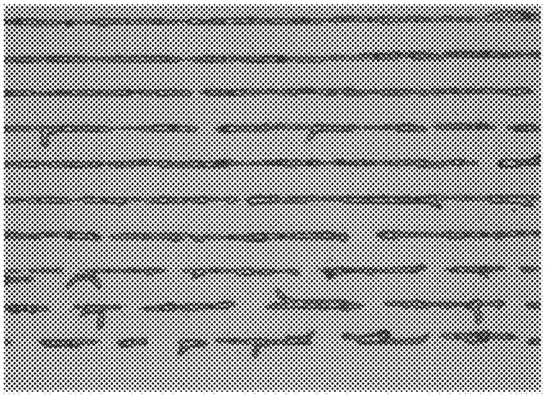
FIG. 8 is an electron microscope photograph of a conductive pattern formed by applying the examples and comparative examples of the present disclosure in an EHD method.
Figure 8:
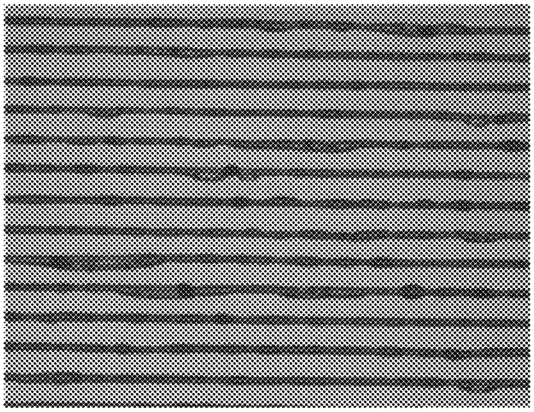
Figure 8:
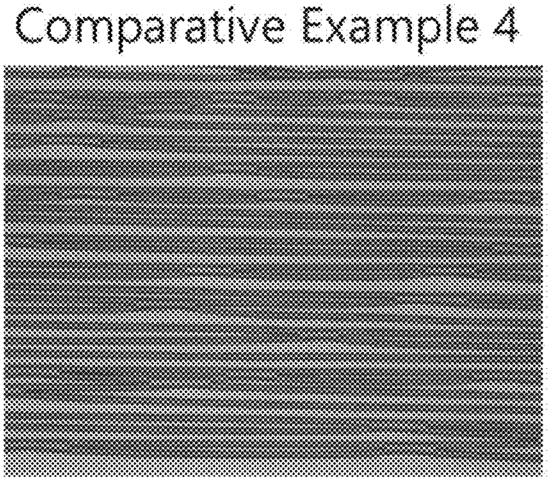
Figure 8:
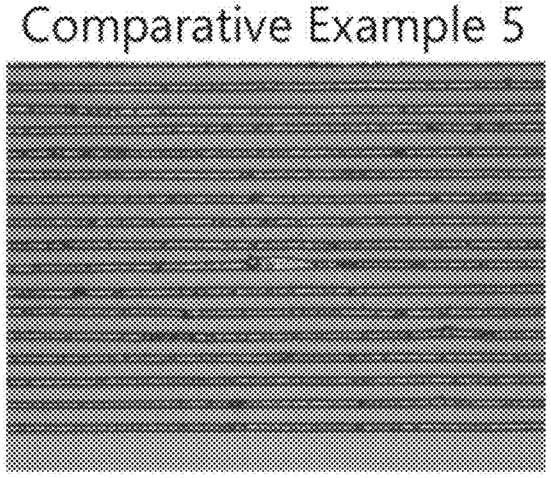

The conductive patterns formed by applying the conductive inks of Examples 1 to 7 and Comparative Examples 1 to 5 on the substrate in an EHD method are shown in FIGS. 6 to 8.

(Experimental Example 6) Single Printing on Chamfered Glass

Figure 9:
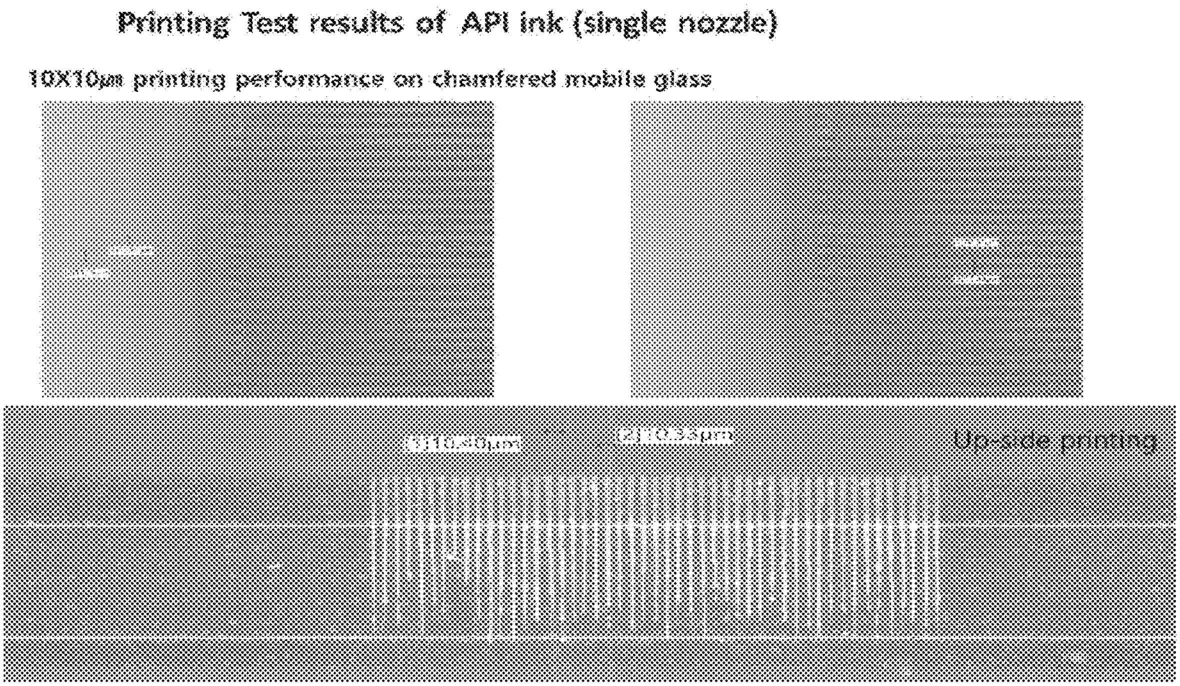
FIG. 9 is an electron microscope photograph of the conductive ink of the present disclosure applied on chamfered glass with a line width of 10×10 μm in a single application.

The conductive inks of Examples 1 to 7 were applied once on chamfered glass with a line width of 10×10 μm, and an electron microscope photograph of one example is shown in FIG. 9.

(Experimental Example 7) Line Width Measurement on Chamfered Glass

Figure 10:
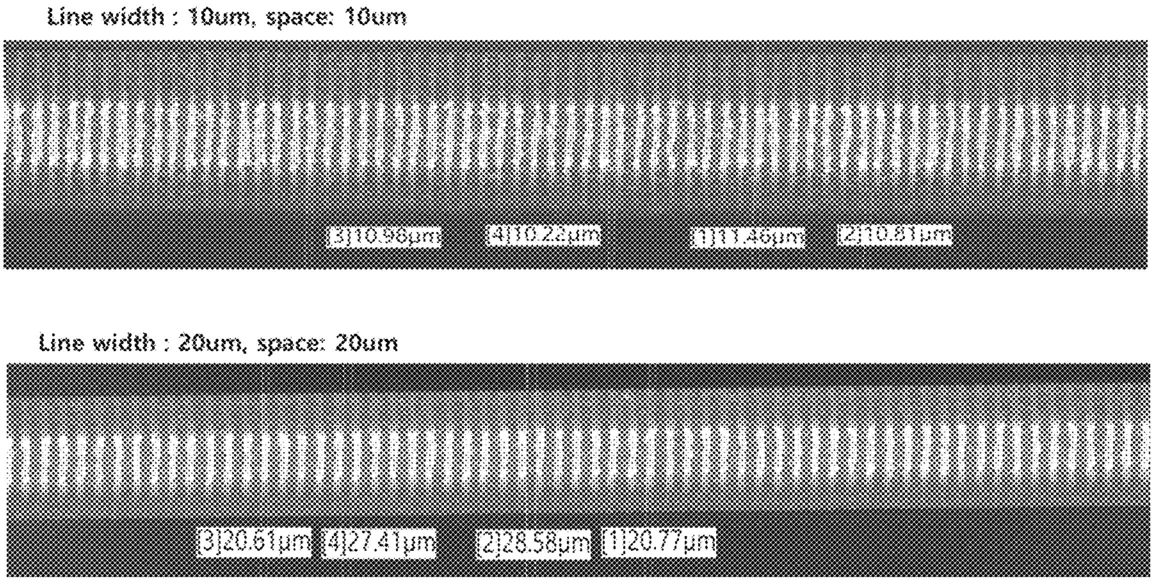
FIG. 10 is an electron microscope photograph of a conductive pattern formed by applying the conductive ink of the present disclosure on chamfered glass in an EHD method.
Figure 11:
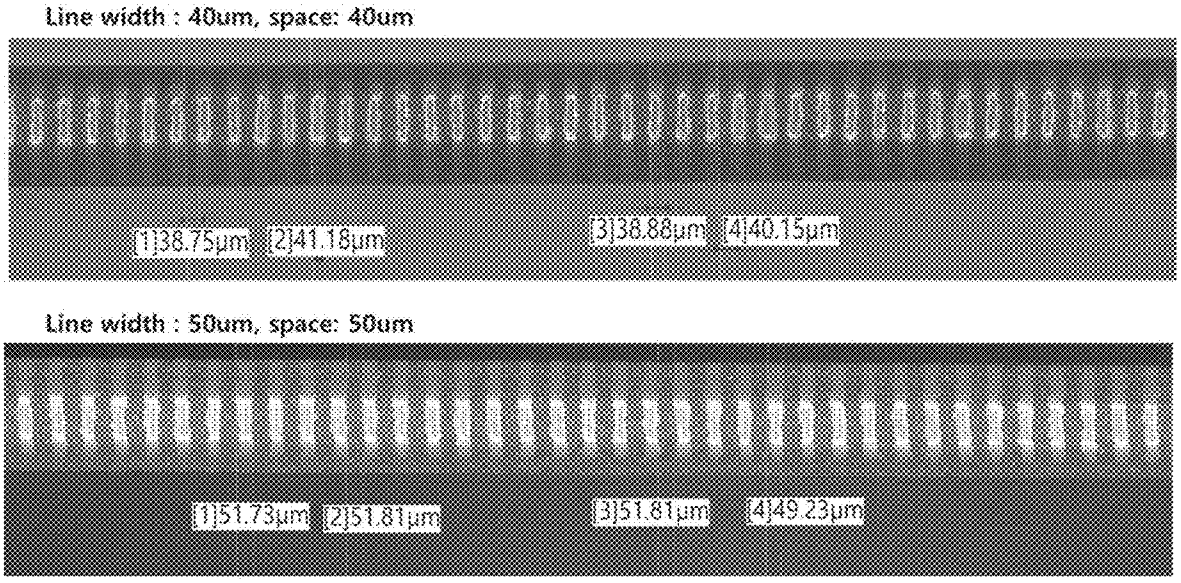
FIG. 11 is an electron microscope photograph of a conductive pattern formed by applying the conductive ink of the present disclosure on chamfered glass in an EHD method.

The conductive inks of Examples 1 to 7 were applied on chamfered glass in 10×10 μm, 20×20 m, 40×40 μm, and 50×50 μm by the EHD method to form conductive patterns, and photographed using an electron microscope, as shown in FIGS. 10 and 11. According to this, it can be confirmed that the line width is uniform and precise even on the chamfered substrate.

Figure 12:
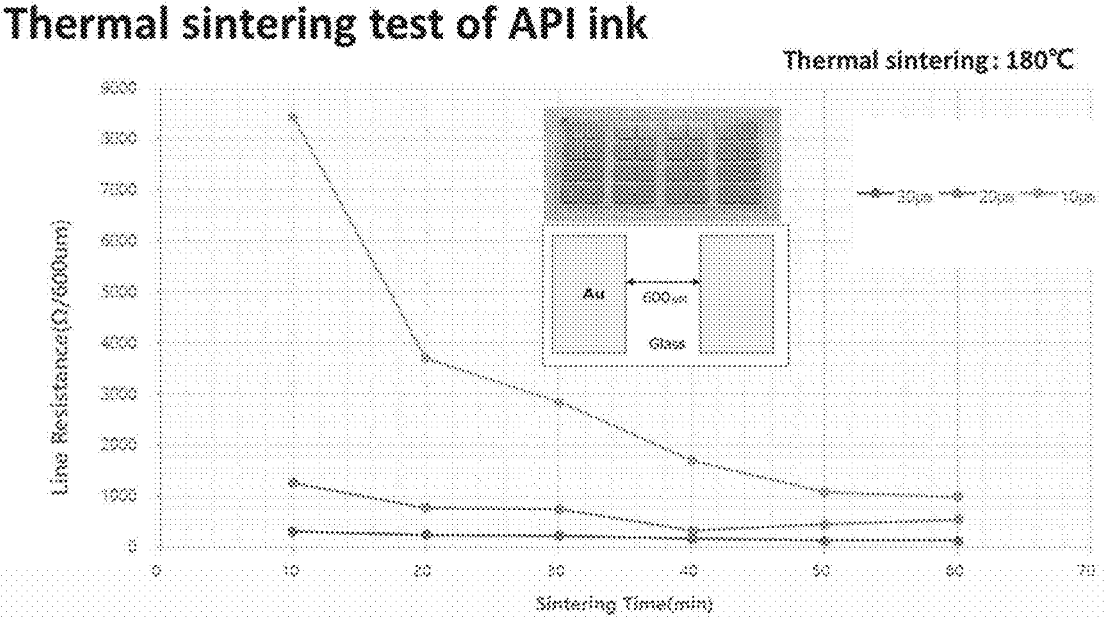
FIG. 12 is a table summarizing the results after forming a 600 μm conductive pattern between gold electrodes spaced 600 μm apart on a substrate by applying the conductive ink of the present disclosure in an EHD method and performing thermal curing.

(Experimental Example 8) Line Resistance Measurement after Thermal Curing Experiment The conductive ink of Example 6 was applied once on the substrate by the EHD method to form a 600 μm conductive pattern between gold electrodes with line widths of 10 am, 20 μm, and 30 μm, and the line resistance was measured after thermal curing, and the results are summarized in FIG. 12. At this time, the aspect ratio of the conductive pattern is 0.1 to 0.2 or less.

For example, when the line width is 10 μm, the height is 1.02 μm, when the line width is 20 μm, the height is 2.28 μm, and when the line width is 30 μm, the height is 3.43 m.

According to this, in the examples of the present disclosure, the line resistance decreased as the line width increased and the curing time was longer.

In particular, the conductive patterns of Examples 1 to 7 and Comparative Examples to 7 were formed with a line width of 10 am, and the line resistance was measured after curing at 180° C. for 30 minutes, and the results are summarized in Table 5.

TABLE 5

| | line resistance (Ω/600 um) |
|---|---|
| Example 1 | 490.18 |
| Example 2 | 1785.41 |
| Example 3 | 1355.78 |
| Example 4 | 1265.11 |
| Example 5 | 2870.22 |
| Example 6 | 2840.3 |
| Example 7 | 2564.03 |
| Comparative Example 1 | 4527.77 |
| Comparative Example 2 | 3555.38 |
| Comparative Example 3 | 4243.07 |
| Comparative Example 4 | Insulation |
| Comparative Example 5 | 3770.23 |
| Comparative Example 6 | 3971.17 |
| Comparative Example 7 | 5110.03 |

According to this, the line resistance of the examples is 2840.3 to 20367.5, while the line resistance of the comparative examples is 14044.0 to 31833.0, which is higher than that of the examples. It is estimated that the line resistance of the examples appears due to the ratio of the electric field reaction element and the charge transfer element used for the spinning characteristics, the characteristics of the conductive element, the printing method, and the density of the pattern formed after EHD jetting.

Figure 13:
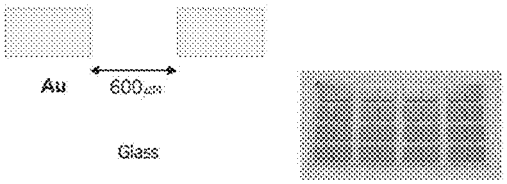
FIG. 13 is a table summarizing the results after forming conductive patterns with line widths of 10 μm, 20 μm, and 30 μm between gold electrodes spaced 600 μm apart on a substrate by applying the conductive ink of the present disclosure in an EHD method and performing laser curing with a power of 6000 mA and a moving speed of 0.2 mm/sec.

(Experimental Example 9) Line Resistance Measurement after Laser Curing Experiment The conductive ink of Example 6 was applied once on the substrate by the EHD method to form a 600 μm conductive pattern between gold electrodes with line widths of 10 am, 20 am, and 30 am, and the line resistance was measured after laser curing, and the results are summarized in FIG. 13. According to this, the line resistance decreased as the line width increased and the power of the laser was higher. At this time, the aspect ratio of the conductive pattern is 0.1 to 0.2.

In particular, the conductive patterns of Examples 1 to 7 and Comparative Examples to 7 were formed with a line width of 10 am, and the line resistance was measured after curing with a laser with a power of 6000 mA and a moving speed of 0.2 mm/sec, and the results are summarized in Table 6.

TABLE 6

| | line resistance (Ω/600 um) |
|---|---|
| Example 1 | 15.55 |
| Example 2 | 52.98 |
| Example 3 | 41.08 |
| Example 4 | 32.88 |
| Example 5 | 86.54 |
| Example 6 | 84.8 |
| Example 7 | 77.52 |
| Comparative Example 1 | 137.15 |
| Comparative Example 2 | 115.64 |
| Comparative Example 3 | 134.57 |
| Comparative Example 4 | Insulation |
| Comparative Example 5 | 112.77 |
| Comparative Example 6 | 117.28 |
| Comparative Example 7 | 130.01 |

According to this, the line resistance of the examples is 84.80 to 608.1, while the line resistance of the comparative examples is 404.7 to 950.4, which is higher than that of the examples. It is estimated that the line resistance of the examples appears due to the ratio of the electric field reaction element and the charge transfer element used for the spinning characteristics, the characteristics of the conductive element, the printing method, and the density of the pattern formed after EHD jetting.

(Experimental Example 10) Line Width Measurement after Laser Curing Experiment

Figure 14:
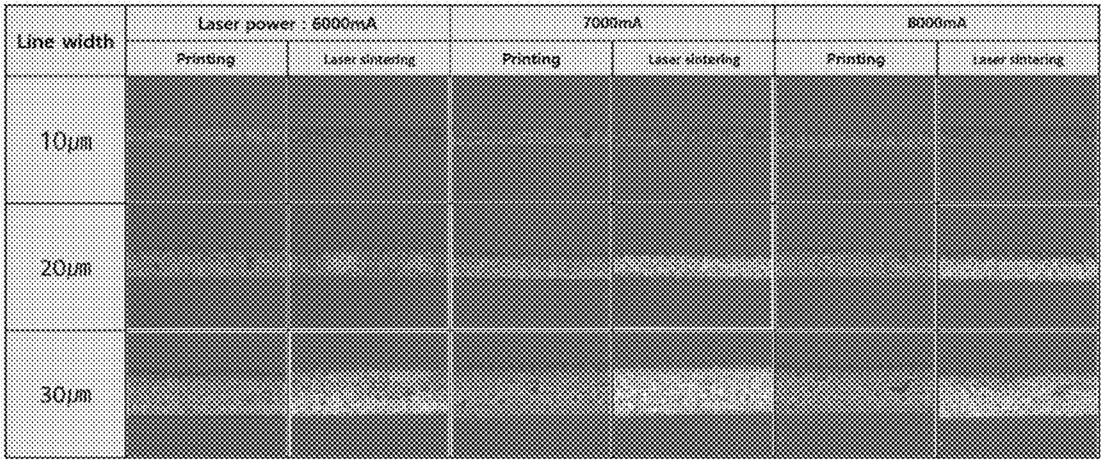
FIG. 14 is a table showing the change in line width after forming conductive patterns with line widths of 10 μm, 20 μm, and 30 μm by applying the conductive ink of the present disclosure on a substrate in an EHD method and performing curing while varying the power of the laser.

The conductive pattern of Example 6 was formed with line widths of 10 μm, 20 μm, and 30 μm, and images of the line width before and after curing with a laser with a power of 6000 mA and a moving speed of 0.2 mm/sec are summarized in FIG. 14.

In particular, the conductive inks of Examples 1 to 4 and Comparative Examples 2 and 6 were applied on the substrate by the EHD method as described above to form conductive patterns with a line width of 10 μm, and the change in line width after curing by varying the power of the laser is summarized in Table 7.

TABLE 7

| | Before curing (W1) | After curing (W2) | W2/W1 |
|---|---|---|---|
| Example 1 | 10.5 | 10.7 | 1.02 |
| Example 2 | 10.2 | 10.5 | 1.03 |
| Example 3 | 10.7 | 11 | 1.03 |
| Example 4 | 10.3 | 10.6 | 1.03 |
| Comparative Example 2 | 10.6 | 12.6 | 1.19 |
| Comparative Example 6 | 10.9 | 13.8 | 1.27 |

According to this, the W2/W1 of the examples shows a narrow variation of 1.02 to 1.03, while the W2/W1 of the comparative examples is higher than that of the examples at 1.19 and 1.27. The reason for the small change in the line width before and after curing in the examples is estimated to be due to the ratio of the electric field reaction element and the charge transfer element, the characteristics of the conductive element, the printing method, and the density of the pattern formed after EHD jetting.

(Experimental Example 11) Line Width Measurement on 2D and 3D Surfaces

Figure 15:
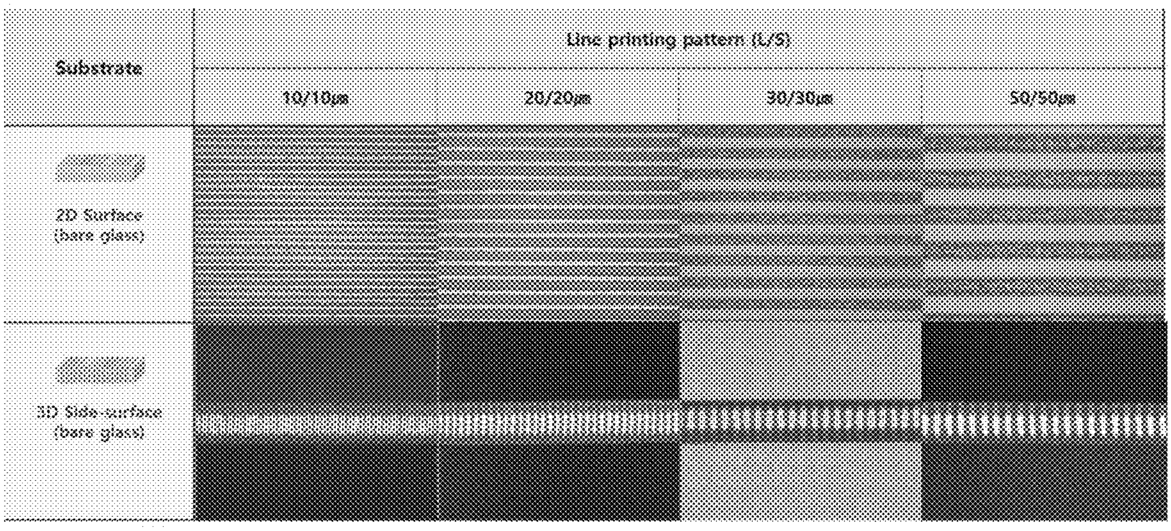
FIG. 15 is a table summarizing the change in line width after forming conductive patterns with line widths of 10 μm, 20 μm, 30 μm, and 50 μm by applying the conductive ink of the present disclosure on bare glass in an EHD method.

The conductive inks of Examples 1 to 7 were applied on bare glass by the EHD method to form conductive patterns with line widths of 10 μm, 20 μm, 30 μm, and 50 μm, and the change in line width is summarized in FIG. 15.

(Experimental Example 12) Measurement of Conductive Particle Aggregation

Figure 16:
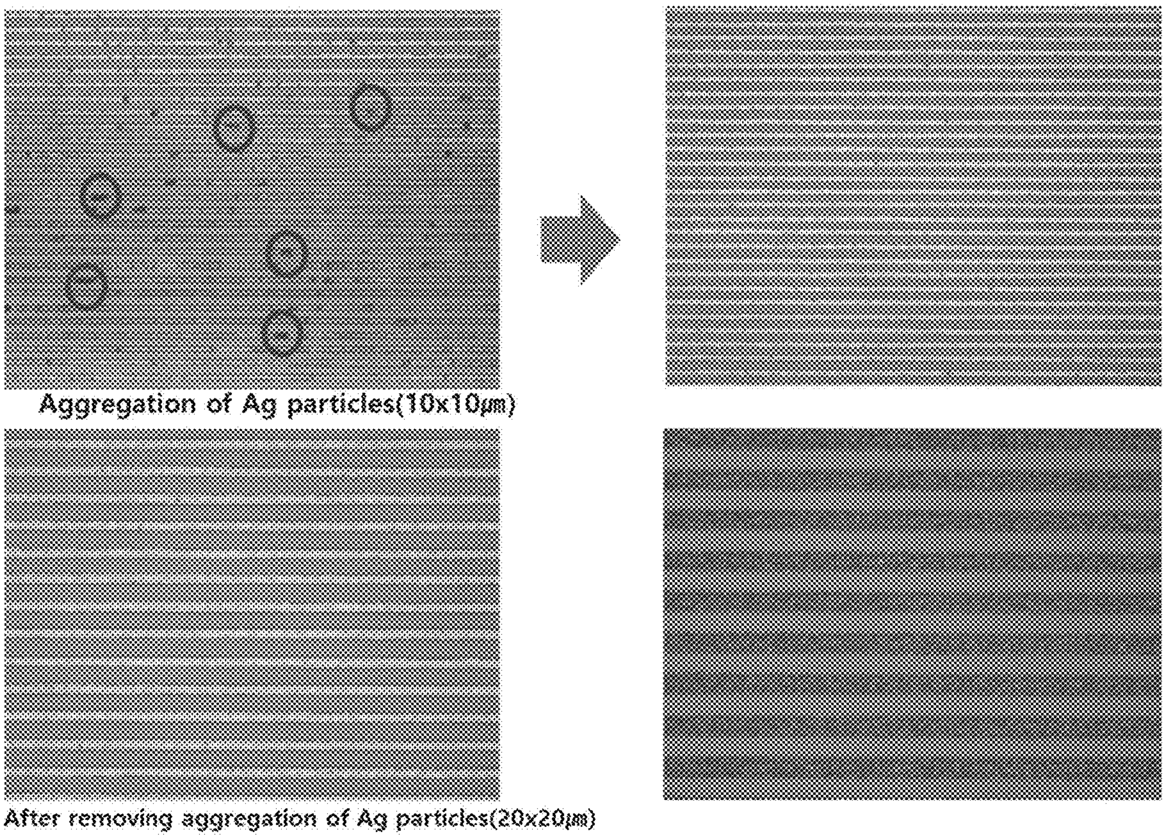
FIG. 16 is a table comparing photographs of conductive patterns formed on a substrate by applying the examples of the present disclosure in an EHD method and photographs of conductive patterns formed on a substrate by applying the comparative examples in an EHD method.

Photographs of the conductive patterns formed on the substrate by applying Examples 1 to 7 by the EHD method and photographs of the conductive patterns formed on the substrate by applying the comparative examples by the EHD method were compared and shown in FIG. 16.

The characteristics, structures, effects, etc. exemplified in each of the above-described examples can be combined or modified for other examples by those skilled in the art to which the examples belong. Therefore, the contents related to such combinations and modifications should be interpreted as being included within the scope of the present disclosure.

What is claimed is:

1. A method of printing a conductive element comprising a conductive ink on a substrate having a three-dimensional surface, the method comprising:

positioning the substrate;

spraying, during an ink spraying step, the conductive ink through a nozzle by electrohydrodynamic (EHD) printing while applying an electric field to print a conformal conductive pattern on the three-dimensional surface of the substrate, wherein the conformal conductive pattern has a width to height aspect ratio in a range of 0.05:1 to 0.3:1; and curing, during a curing step, the sprayed conductive pattern to form a cured conductive pattern, wherein the conductive ink comprises:

an electric field reaction element that is a water-soluble polymer including a heterogeneous element that can react to assist the movement of charges in the electric field; and a charge transfer element that provides a charge that moves in the electric field in the conductive ink, wherein the charge transfer element is split into ions in an aqueous solution state and moves as a charge, affecting the electric field reaction element to control the fluidity of the conductive ink, wherein the electric field reaction element and the charge transfer element are included in a weight ratio of 10:1 to 3:1, wherein the electric field reaction element and the charge transfer element interact with each other and determine ejection performance of the conductive ink in the electric field during the ink spraying step to conformally print the conductive pattern on the three-dimensional surface.

2. The method of claim 1, wherein the conductive pattern is thermally or optically cured after the spraying.

3. The method of claim 2, wherein the substrate having the three-dimensional structure has a three-dimensional structure on the surface or is curved or bent into a three-dimensional shape.

4. The method of claim 3, wherein in the spraying of the conductive ink, the three-dimensional surface comprises top, bottom, and side surfaces of a bent edge of the substrate, and the conductive ink forms an electrical pattern continuously connecting the top surface and the side surface or the bottom surface and the side surface.

5. The method of claim 1, wherein the conductive pattern having a line width W1 is formed in the spraying of the conductive ink, and the conductive pattern has a line width W2 after being cured by laser having power of 6000 mA to 8000 mA in the curing, where W2/W1 is 0.9 to 1.1.

6. The method of claim 5, wherein in the spraying of the conductive ink, a portion of side and top surfaces is printed to form a portion of the pattern, and a portion of side and bottom surfaces is printed by inverting the substrate.

7. The method of claim 6, wherein in the spraying of the conductive ink, as the nozzle approaches one surface of the substrate, the conductive ink moves toward the substrate and a line of the conductive ink ejected from the nozzle is printed on the one surface of the substrate facing the nozzle.

8. The method of claim 7, wherein in the spraying of the conductive ink, the printing is performed by passing the nozzle from one side to the other of the substrate and then moving the nozzle in the opposite direction.

9. The method of claim 1, wherein the nozzle used in the spraying of the conductive ink comprises a plurality of nozzles.

10. The method of claim 9, wherein in the spraying of the conductive ink, the spraying forms the conductive pattern due to a linear jet flow portion (J1) or a spinning jet flow portion (J2).

11. The method of claim 1, wherein in the printing, the electric field has a voltage of 1 kV to 2 kV.

* * * * *